US012424906B2

(12) United States Patent
Miyazono

(10) Patent No.: US 12,424,906 B2
(45) Date of Patent: Sep. 23, 2025

(54) COOLING STRUCTURE OF IN-WHEEL MOTOR

(71) Applicant: TOYOTA JIDOSHA KABUSHIKI KAISHA, Toyota (JP)

(72) Inventor: Hideaki Miyazono, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 18/112,706

(22) Filed: Feb. 22, 2023

(65) Prior Publication Data

US 2023/0327519 A1   Oct. 12, 2023

(30) Foreign Application Priority Data

Apr. 6, 2022   (JP) .................. 2022-063460

(51) Int. Cl.
| | |
|---|---|
| H02K 9/19 | (2006.01) |
| B60K 7/00 | (2006.01) |
| H02K 9/10 | (2006.01) |
| H02K 9/12 | (2006.01) |

(52) U.S. Cl.
CPC ............. H02K 9/19 (2013.01); B60K 7/0007 (2013.01)

(58) Field of Classification Search
CPC .................. H02K 9/19; H02K 9/10
USPC ........................ 310/52, 54, 58, 59
See application file for complete search history.

(56) References Cited

U.S. PATENT DOCUMENTS

| | | |
|---|---|---|
| 2008/0067882 A1 | 3/2008 | Murata |
| 2009/0236158 A1 | 9/2009 | Sakuma et al. |

FOREIGN PATENT DOCUMENTS

| | | | |
|---|---|---|---|
| JP | 2008-072881 A | 3/2008 | |
| JP | 2009-226973 A | 10/2009 | |
| JP | 4918051 B2 | 4/2012 | |
| WO | 2015/174212 A1 | 11/2015 | |
| WO | WO-2019138965 A1 * | 7/2019 | ............... B60K 6/40 |

* cited by examiner

*Primary Examiner* — Jose A Gonzalez Quinones
(74) *Attorney, Agent, or Firm* — Sughrue Mion, PLLC

(57) ABSTRACT

The cooling structure of the in-wheel motor is a cooling structure of an in-wheel motor provided in a wheel of a tire-wheel assembly. The cooling structure of the in-wheel motor includes a rotary electric machine configured to rotate a hub to which a wheel is fixed, a knuckle rotatably supporting the hub, and a plurality of flow paths through which a coolant for cooling the rotary electric machine flows, and a pump configured to circulate the coolant between the rotary electric machine and the knuckle via a plurality of flow paths provided inside the knuckle.

4 Claims, 1 Drawing Sheet

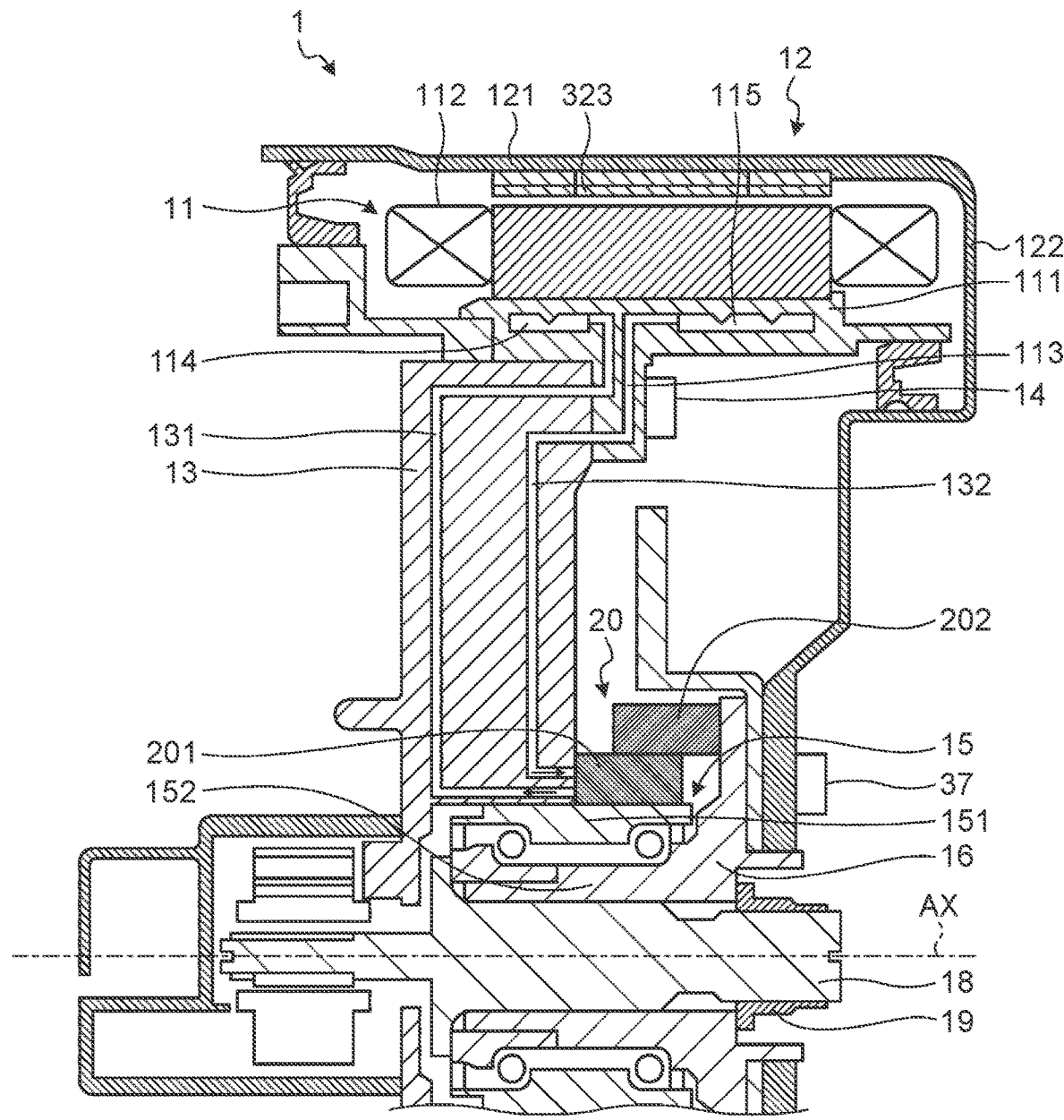

COOLING STRUCTURE OF IN-WHEEL MOTOR

CROSS-REFERENCE TO RELATED APPLICATION

This application claims priority to Japanese Patent Application No. 2022-063460 filed on Apr. 6, 2022, incorporated herein by reference in its entirety.

BACKGROUND

1. Technical Field

The present disclosure relates to a cooling structure of an in-wheel motor.

2. Description of Related Art

Japanese Unexamined Patent Application Publication No. 2009-226973 (JP 2009-226973 A) discloses a cooling structure of an in-wheel motor including: a knuckle having a tank portion for storing a coolant; a pump for pumping the coolant in the tank portion to the motor by a rotational power of the motor; a first pipe for sending the coolant in the tank portion to the pump; a first flow path for sending the coolant pumped from the pump to each component of the motor in a housing; and a second pipe for sending the coolant in the housing to the tank portion.

SUMMARY

However, in the cooling structure of the in-wheel motor disclosed in JP 2009-226973 A, there is a possibility that a pipe (a flow path) through which a coolant flows is damaged by a flying stone or the like while the vehicle is traveling.

The present disclosure has been made in view of the above problems, and an object thereof is to provide a cooling structure of an in-wheel motor capable of suppressing a flow path in which a coolant flow through from being damaged.

A cooling structure of an in-wheel motor according to a first aspect of the present disclosure is a cooling structure of an in-wheel motor provided in a wheel of a tire-wheel assembly. The cooling structure of the in-wheel motor includes: a rotary electric machine configured to rotate a hub to which the wheel is fixed; a knuckle provided with a plurality of flow paths through which a coolant for cooling the rotary electric machine flows, and the knuckle supporting the hub such that the hub is rotatable; and a pump configured to circulate the coolant to and from the rotary electric machine through the flow paths provided inside the knuckle.

According to such a configuration, since the flow path for circulating the coolant between the pump and the rotary electric machine is provided in the knuckle, it is possible to suppress the flow path from being damaged by a flying stone or the like.

In the cooling structure of the in-wheel motor according to the first aspect, the pump may be driven as the hub rotates.

According to such a configuration, it is possible to reduce the cost by not separately providing a dedicated drive source for driving the pump.

In the cooling structure of the in-wheel motor according to the first aspect, the pump may include a fixed portion provided in an outer race of a hub bearing interposed between the hub and the knuckle, and a rotating portion provided in the hub.

According to such a configuration, the pump can be driven by a rotational difference between the fixed portion and the rotating portion as the hub rotates.

The cooling structure of the in-wheel motor according to the present disclosure has an effect of suppressing the flow path through which the coolant flows from being damaged.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a cross-sectional view illustrating a schematic configuration of an in-wheel motor according to an embodiment.

DETAILED DESCRIPTION OF EMBODIMENTS

Hereinafter, an embodiment of a cooling structure of an in-wheel motor according to the present disclosure will be described. This embodiment is not intended to limit the present disclosure.

FIG. 1 is a cross-sectional view illustrating a schematic configuration of an in-wheel motor 1 according to an embodiment. The in-wheel motor 1 according to the embodiment includes a stator 11 and a rotor 12, and is provided in a wheel of a tire-wheel assembly. The stator 11 includes a stator core 111, a stator coil 112, and a stator spindle 113. Further, the stator coils 112 are arranged at equal intervals around the stator 11 having a substantially ring shape. The stator coil 112 can generate a rotating magnetic field at a predetermined speed by receiving electric power from a battery. The stator spindle 113 is fixed to a knuckle 13 fixed to the suspension arm by a bolt 14. The knuckle 13 rotatably supports the hub 16 via a hub bearing 15 in which a plurality of balls are disposed between an outer race (outer ring) 151 and an inner race (inner ring) 152.

On the outside of the stator 11, a rotor 12 having a rim portion 121 and a disk portion 122 is rotatably disposed at a predetermined interval from the stator 11. In the in-wheel motor 1 according to the embodiment, the rotor 12 includes a rim portion 121 and a disk portion 122 as constituent elements constituting a wheel of a tire-wheel assembly. The rim portion 121 is located on the radially outer side of the stator 11. The disk portion 122 is located outside in the axial direction of the stator 11. In the present embodiment, the "axial direction" is a direction in which an axial AX of an axle 18 to be described later extends, unless otherwise specified. On the inner peripheral side of the rim portion 121, a magnet 123 such as a permanent magnet is disposed so as to face the stator core 111 of the stator 11, so that the rotor 12 rotates with respect to the stator 11 with the movement of the rotating magnetic field. Since the rotor 12 is fixed to the hub 16 by the hub bolt 17, the tire-wheel assembly can be rotated at a predetermined speed by the rotation of the rotor 12.

The axle 18 corresponds to a rotational axis of a tire-wheel assembly on which the in-wheel motor 1 is mounted, and is rotatable about an axial AX. An end portion of the axle 18 on the vehicle outer side is fixed to the hub 16 by a locking ring 19.

The mechanical pump 20 is, for example, an oil pump that pumps a coolant (oil) that is a refrigerant. An inner race 201, which is a fixed portion constituting the pump 20, is attached to the outer race 151 of the hub bearing 15, and an outer race 202, which is a rotating portion constituting the pump 20, is attached to the hub 16. As the outer race 202 rotates with the rotation of the hub 16, the pump 20 is driven by the rotational difference between the inner race 201 and the outer race 202. Instead of the mechanical pump 20, an electric pump may be used. At this time, the electric pump may be provided in the outer race 151 of the hub bearing 15.

Inside the stator core 111, a first cooling flow path 114 and a second cooling flow path 115, which are flow paths that extend in the circumferential direction of the stator 11 and through which the cooling liquid flows, are arranged side by side in the axial direction. The first cooling flow path 114 and the second cooling flow path 115 are partially in communication with each other in the stator core 111.

The inside of the knuckle 13 and the inside of the stator 11 (the stator core 111 and the stator spindle 113) are provided with the first cooling flow path 114 and the second cooling flow path 115 in the stator core 111, and the forward flow path 131 and the return flow path 132 which are a plurality of flow paths for circulating the cooling liquid between the pump 20 so as to communicate with each other. The connecting portion between the knuckle 13 and the stator 11 (stator spindle 113) in the forward flow path 131 and the return flow path 132 is a position where the bolt 14 for fastening the knuckle 13 and the stator spindle 113 in the circumferential direction of the stator 11 is not present. In addition, a gasket (not shown) is inserted into a connection portion between the knuckle 13 and the stator 11 (stator spindle 113) in the forward flow path 131 and the return flow path 132, and the sealing property at the connection portion is ensured.

The inflow end of the forward flow path 131 communicates with the discharge port of the pump 20, and the outflow end of the forward flow path 131 communicates with the first cooling flow path 114 in the stator core 111. Further, the inflow-side end portion of the return channel 132 communicates with the second cooling channel 115 in the stator core 111, and the outflow-side end portion of the return channel 132 communicates with the inflow port of the pump 20.

Note that the knuckle 13 may be provided with a flow path for allowing a cooling liquid such as the forward flow path 131 and the return flow path 132 to flow therethrough by increasing its physique as necessary in consideration of strength and the like. As a method of providing the forward flow path 131 and the return flow path 132 in the knuckle 13, for example, after digging a groove corresponding to the forward flow path 131 and the return flow path 132 in the wall surface of the knuckle 13 by drilling or the like, or covering the groove with a lid member, when manufacturing the knuckle 13 by casting, it is sufficient to provide a core in a portion corresponding to the forward flow path 131 and the return flow path 132.

In the cooling structure of the in-wheel motor 1 according to the embodiment, the pump 20 is driven in accordance with the rotation of the hub 16, so that the cooling liquid discharged from the pump 20 circulates back to the pump 20 in the order of the forward passage 131, the first cooling passage 114, the second cooling passage 115, and the return passage 132, as shown in FIG. 1.

In the cooling structure of the in-wheel motor 1 according to the embodiment, the cooling liquid is circulated by the pump 20, and the cooling liquid flowing through the first cooling flow path 114 and the second cooling flow path 115 removes heat from the stator core 111, whereby the stator core 111 and thus the stator 11 can be cooled. Further, the cooling liquid that has received the heat from the stator core 111 flows out from the second cooling flow path 115 to the return flow path 132, flows through the return flow path 132, the pump 20, and the forward flow path 131 in this order, and the heat of the cooling liquid is transferred to the knuckle 13 in the forward flow path 131 and the return flow path 132 until the cooling liquid flows into the first cooling flow path 114 again, and is dissipated to the air flowing around the knuckle 13.

As described above, in the cooling structure of the in-wheel motor 1 according to the embodiment, by driving the pump 20 with the rotation of the hub 16, the cooling liquid is circulated between the first cooling flow path 114 and the second cooling flow path 115 and the pump 20 via the forward flow path 131 and the return flow path 132, whereby the temperature of the cooling liquid can be lowered while the cooling liquid flows through the forward flow path 131 and the return flow path 132, and the stator core 111 and thus the stator 11 can be cooled by the cooling liquid.

Further, in the cooling structure of the in-wheel motor 1 according to the embodiment, since an outgoing pipe such as a cooling hose for circulating the cooling liquid between the first cooling flow path 114 and the second cooling flow path 115 and the pump provided in the stator core 111 is not required, it is possible to solve various problems such as restrictions on the mounting space for mounting the outgoing pipe, damage to the outgoing pipe due to a pop stone or the like.

What is claimed is:

1. A cooling structure of an in-wheel motor, the cooling structure being provided in a wheel of a tire-wheel assembly, the cooling structure comprising:
   a rotary electric machine configured to rotate a hub to which the wheel is fixed;
   a knuckle provided with a plurality of flow paths through which a coolant for cooling the rotary electric machine flows, and the knuckle supporting the hub such that the hub is rotatable; and
   a pump configured to circulate the coolant to and from the rotary electric machine through the flow paths provided inside the knuckle, the pump including (i) a fixed portion provided in an outer race of a hub bearing interposed between the hub and the knuckle, and (ii) a rotating portion provided in the hub.

2. The cooling structure according to claim 1, wherein the pump is configured to be driven as the hub rotates.

3. The cooling structure according to claim 1, wherein the pump includes the outer race and an inner race, and
   wherein upon rotation of the outer race with rotation of the hub, the pump is driven by a rotational difference between the inner race and the outer race.

4. The cooling structure according to claim 3, wherein the cooling structure further comprises:
   a first cooling passage and a second cooling passage,
   wherein the plurality of cooling paths include a forward flow path and a reverse flow path, and
   wherein upon rotation of the outer race with the rotation of the hub, the pump is configure to discharge a cooling liquid through the forward flow path to the first cooling passage and from the first cooling passage to the second cooling passage to cool the stator, and wherein the liquid is transferred from the second cooling passage to the reverse flow path.

* * * * *